UNITED STATES PATENT OFFICE.

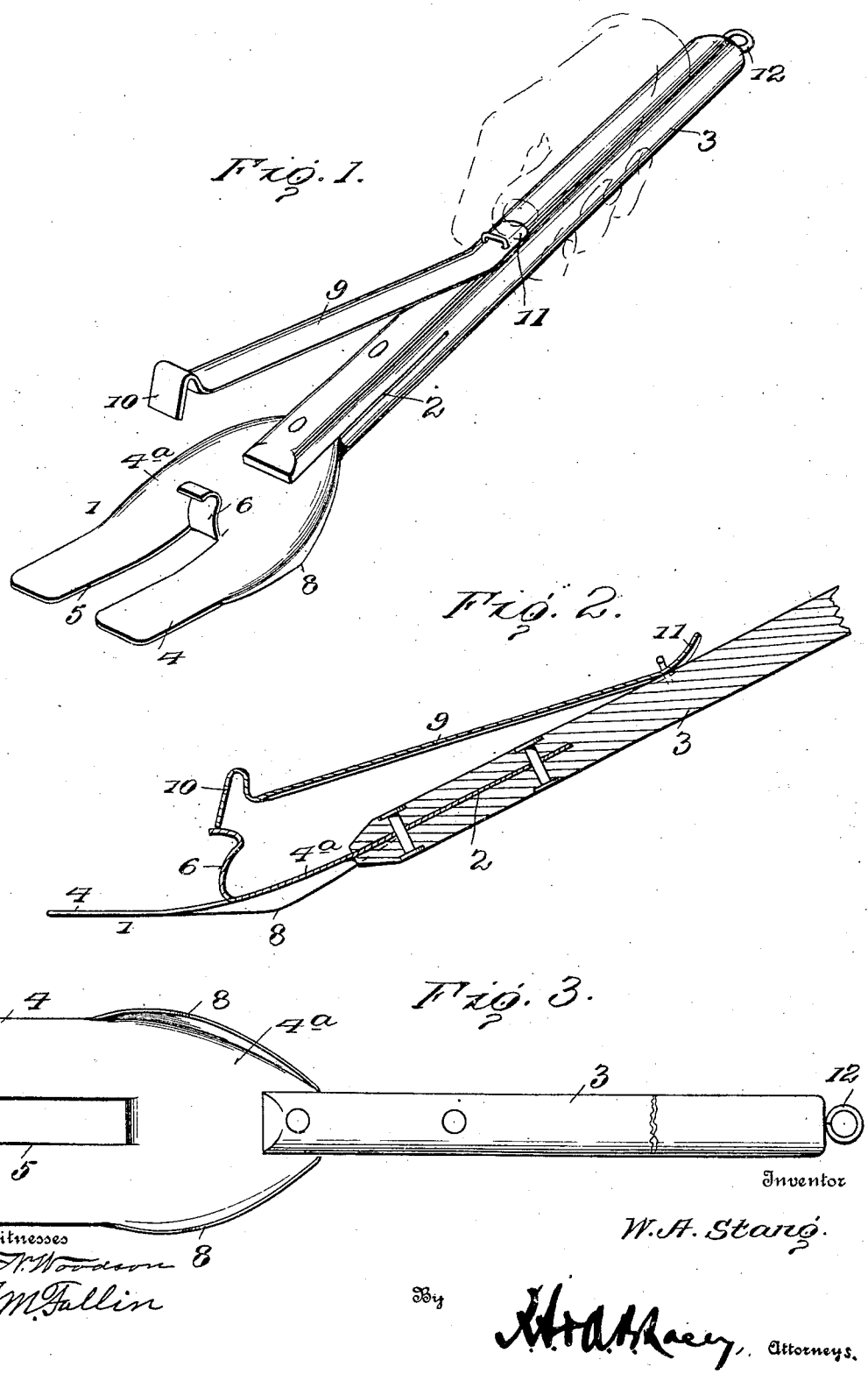

WALTER A. STANG, OF LORAIN, OHIO.

PAN-LIFTER.

946,568.  Specification of Letters Patent.  Patented Jan. 18, 1910.

Application filed March 23, 1909.  Serial No. 485,170.

*To all whom it may concern:*

Be it known that I, WALTER A. STANG, citizen of the United States, residing at Lorain, in the county of Lorain and State of Ohio, have invented certain new and useful Improvements in Pan-Lifters, of which the following is a specification.

This invention comprehends certain new and useful improvements in kitchen utensils and the object of the invention is an improved lifter by means of which pans may be placed in or removed from the oven with facility and without the liability of the person becoming burned, the device being susceptible of being quickly applied to the pan and being adapted for use with pans of different sizes.

With this and other objects in view that will more fully appear as the description proceeds, the invention consists of certain constructions and arrangements of the parts that I shall hereinafter fully describe and then point out the novel features thereof in the appended claims.

For a full understanding of the invention and the merits thereof and to acquire a knowledge of the details of construction, reference is to be had to the following description and accompanying drawings, in which:

Figure 1 is a perspective view of a lifter constructed in accordance with my invention; Fig. 2 is a longitudinal section thereof; and, Fig. 3 is a bottom plan view.

Corresponding and like parts are referred to in the following description and indicated in all the views of the drawing by the same reference characters.

My improved lifter consists essentially of a metallic plate or blade 1 which is formed at its rear end with a shank 2 that is secured to a suitable handle 3, the latter being preferably of wood or other non-conducting substance or material. The plate is preferably bent intermediate of its ends along a transverse line, so that the front and rear portions 4 and 4ª of the plate are arranged in angular relation, thereby causing the handle to be disposed at an incline when the forward portion is inserted beneath a pan and admitting of the more ready manipulation of the device. In the present instance the plate is bifurcated and is formed with a slot 5 leading from the forward end thereof and extending longitudinally to a point at the rear of the transverse line of bending, by virtue of which construction the rear portions of the bifurcations are disposed at an incline to the forward portions thereof. The metal cut from the plate to form the slot 5 is bent upwardly at the terminal thereof, so as to project a predetermined distance above the plate, and is curved to constitute a forwardly facing hook 6 adapted to take over the rim of the pan to be lifted. The side edges of the rear portion 4ª are returned downwardly and designed to bear against the surface upon which the pan is supported, the said edges being formed at corresponding points, preferably at the rear of the hook 6, with angular portions 8 that admit of the device being rocked thereabout, so as to cause the pan to ride upon the inclined rear portions of the bifurcations and insure of the rim of the pan being engaged by the hook 6, after which the pan may be carried from place to place or similarly manipulated without fear of the contents being spilled or the person becoming burned.

Inasmuch as the hook 6 is of a predetermined height, it will be observed that it is only susceptible of application to pie pans and others having sides of an approximate short height, and therefore in order to increase the scope of the lifter, I employ a lever 9 that is fulcrumed at an intermediate point upon the handle as shown. At its forward end this lever terminates in a downwardly facing hook 10 which in normal position, when not in use, is designed to rest upon the hook 6. The rear arm of the lever is comparatively short and is angularly disposed, so as to be normally arranged in spaced relation to the handle. This last named end of the lever constitutes a finger-piece 11 that is adapted to be pressed against the handle, so as to raise the forward end of the lever above the hook 6, according to the height of the pan, and admit of the hook 10 engaging the rim thereof. The operator then shifts his grip so as to press the forward end of the lever toward the handle and thereby retain the hook 10 in engagement with the rim of the pan and against accidental displacement.

For convenience the handle 3 is provided with an eye 12 through the instrumentality of which the device may be suspended in proximity to the stove, so as to be always ready for immediate use when occasion demands.

From the foregoing description in connection with the accompanying drawings it will be apparent that I have provided an improved pan lifter which may be applied to pans of different sizes and shapes and obviates the use of a cloth, as heretofore employed when manipulating heated vessels; which embodies to a marked degree the characteristics of simplicity, durability and efficiency in construction and operation; and which is very handy, and possesses certain other advantages that will at once recommend it to house-keepers or others for whom it is intended. Furthermore, the article may be easily and cheaply manufactured, inasmuch as the plate or blade 1 may be stamped from an integral piece of blank material.

It is to be observed that since the side edge of the plate are returned downwardly, the latter is considerably strengthened or braced, so as to retain its proper shape when subjected to excessive strain.

Having thus described the invention what is claimed as new is:

1. As a new article of manufacture, a pan lifter comprising a handle, a supporting blade secured to one end of the handle and formed of a single sheet of metal, the blade having a strip of metal struck longitudinally therefrom and bent in angular relation thereto to form an outstanding hook for taking over the rim of a pan to be lifted.

2. As a new article of manufacture, a pan lifter comprising a handle, a supporting-blade secured at one end to the handle and formed of a single sheet of metal, the blade having a strip of metal struck longitudinally from the opposite end thereof to provide a slot arranged intermediate of the side edges of the blade, the strip being bent angularly from the blade at the terminal of the slot to form an outstanding hook facing toward the last named end of the blade and adapted to take over the rim of a pan.

3. As a new article of manufacture, a pan lifter comprising a handle, a supporting blade secured to one end of the handle, and a lever extending longitudinally of the handle and bent angularly at an intermediate point and fulcrumed at said point on the handle, one arm of the lever extending beyond the handle and across the blade and terminating in a hook facing the latter, the other arm of the lever being normally spaced apart from the handle and constituting a finger-piece for rocking the lever, as and for the purpose specified.

In testimony whereof I affix my signature in presence of two witnesses.

WALTER A. STANG. [L. S.]

Witnesses:
TENA HALL,
BLANCHE BATES.